(12) United States Patent  
Erik

(10) Patent No.: US 6,900,416 B1
(45) Date of Patent: May 31, 2005

(54) GREASE GUN WARMER

(76) Inventor: Petry Erik, 3212 S Mulford Rd., Rochelle, IL (US) 61068

( * ) Notice: Subject to any disclaimer, the term of this patent is extended or adjusted under 35 U.S.C. 154(b) by 0 days.

(21) Appl. No.: 10/729,812

(22) Filed: Dec. 5, 2003

Related U.S. Application Data

(60) Provisional application No. 60/431,103, filed on Dec. 5, 2002.

(51) Int. Cl.[7] ............................................. H05B 3/34
(52) U.S. Cl. ...................... 219/528; 219/529; 219/549
(58) Field of Search ................................ 219/528, 529, 219/385, 476, 521, 549

(56) References Cited

U.S. PATENT DOCUMENTS

| | | | |
|---|---|---|---|
| 2,577,870 A | | 12/1951 | Aston |
| 3,079,486 A | * | 2/1963 | Wincheil ...................... 219/528 |
| 3,445,046 A | * | 5/1969 | Wilson ...................... 224/148.5 |
| 3,500,014 A | | 3/1970 | Longo |
| 4,134,004 A | | 1/1979 | Anderson |
| 4,806,736 A | | 2/1989 | Schirico |
| 4,926,029 A | | 5/1990 | Pearson |
| 4,974,752 A | | 12/1990 | Sirek |
| 5,004,894 A | | 4/1991 | Whitehead |
| 5,173,585 A | * | 12/1992 | Dokken ...................... 219/201 |
| 5,210,396 A | | 5/1993 | Sanders |
| 5,429,331 A | * | 7/1995 | Massena .................. 248/176.2 |
| 5,569,401 A | | 10/1996 | Gilliland |
| 5,615,805 A | | 4/1997 | Yoncak |
| 5,860,415 A | * | 1/1999 | Waters ........................ 126/680 |
| 5,981,909 A | * | 11/1999 | Freeman ..................... 219/386 |
| 5,998,771 A | | 12/1999 | Mariano |
| 6,018,143 A | | 1/2000 | Check |
| 6,084,211 A | * | 7/2000 | Bauer ......................... 219/242 |
| 6,209,723 B1 | | 4/2001 | Fields |
| 6,281,477 B1 | | 8/2001 | Forrester |
| 6,555,789 B2 | * | 4/2003 | Owens et al. ............... 219/387 |
| 6,698,601 B1 | * | 3/2004 | Nez ........................... 211/70.6 |
| 6,713,727 B1 | * | 3/2004 | Johnson ...................... 219/386 |

* cited by examiner

Primary Examiner—Robin O. Evans
Assistant Examiner—Vinod Patel
(74) Attorney, Agent, or Firm—Keith Frantz

(57) ABSTRACT

A grease gun holder includes a body and a closure flap. The body is provided with compartments to carry a grease gun and a spare grease cartridge. The body and flap are provided with heating elements to maintain the grease in a warmed, readily usable condition in cooler environments.

12 Claims, 4 Drawing Sheets

FIG. 2
FIG. 3
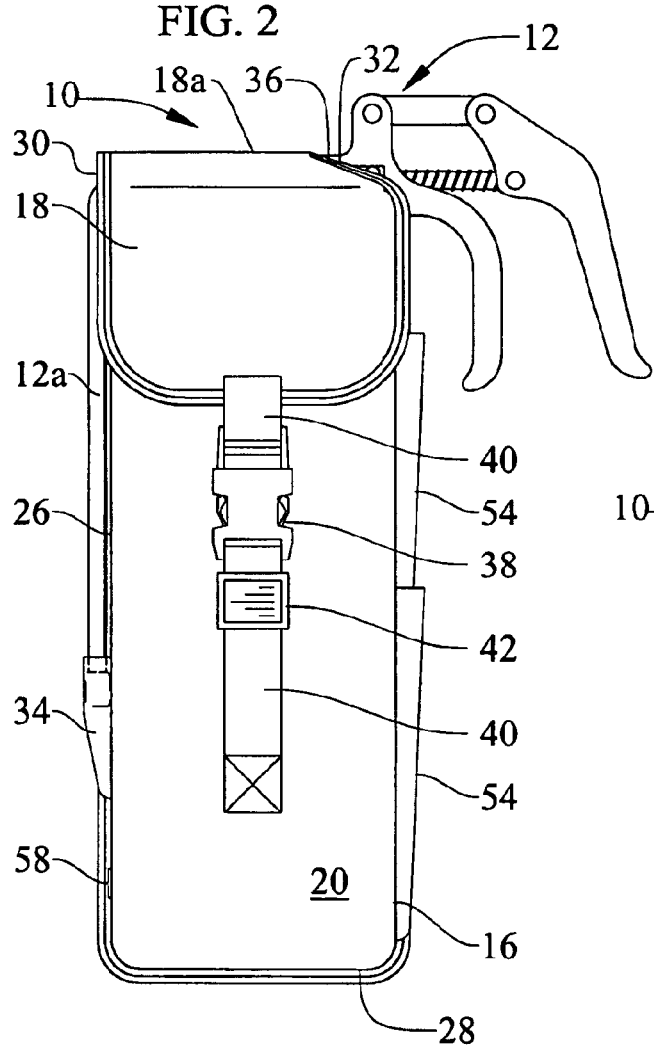
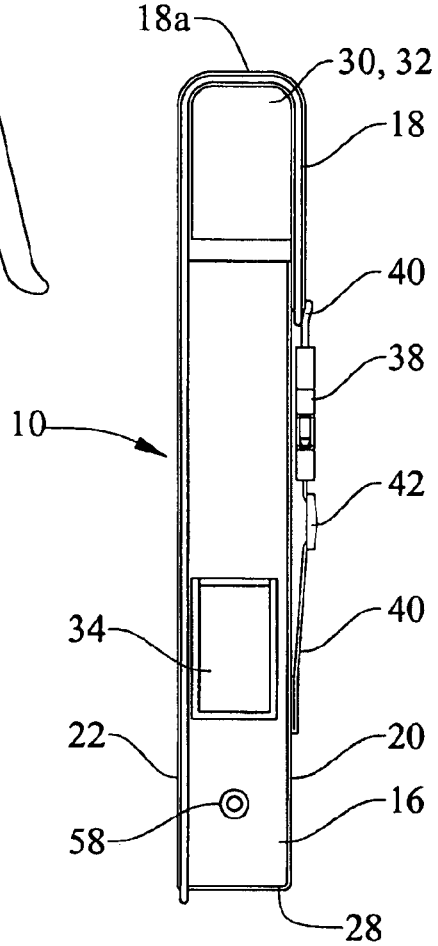

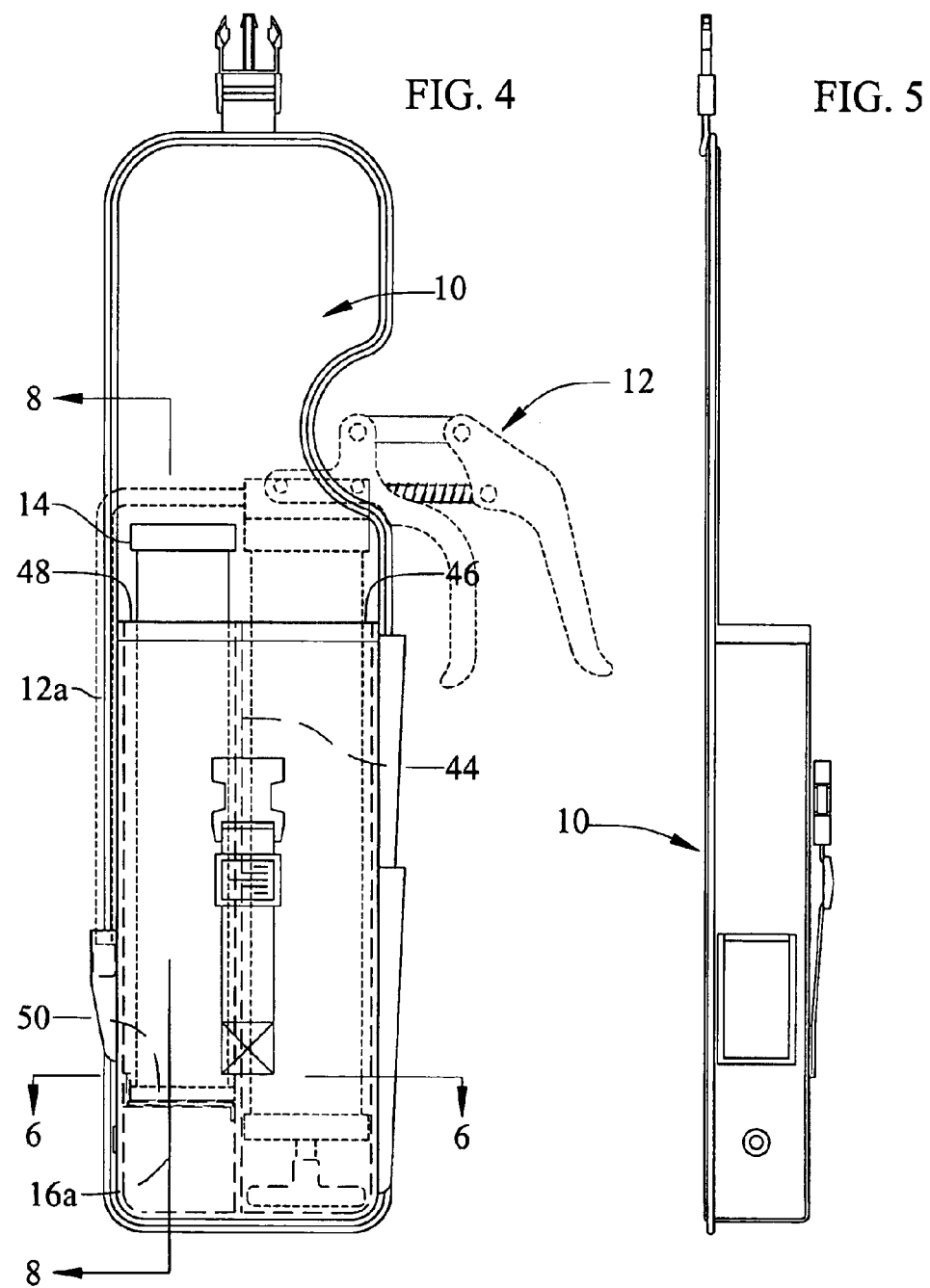

GREASE GUN WARMER

Cross-references to related applications: This application claims the benefit of U.S. Provisional Application No. 60/431,103, filed Dec. 5, 2002.

Statement Regarding Federally Sponsored Research or Development: Not Applicable.

Reference to sequence listing, a table, or computer program listing appendix submitted on a compact disc: Not Applicable.

BACKGROUND OF THE INVENTION

1. Field of Invention

The present invention relates generally to portable grease gun holders.

More particularly, the invention relates to a holder that is configured to carry a grease gun and a spare grease cartridge, and to warm the grease gun and grease cartridge such as is particularly useful in cooler environments.

2. Description of Prior Art

It is well understood that grease must be relatively warm in order to readily flow out a grease gun. However, there are certain instances when it is desired to use a grease gun in environments that cool the grease and make dispensing of the grease difficult. In such instances, a user may set the grease gun onto a heat source, such as in the hot air flow of a truck or cab heater until the grease is sufficiently warmed for dispensing.

There are certain drawbacks and disadvantages associated with heating a grease gun in such a manner. As the grease warms, residual grease in the hose tends to drip from the nozzle. This is inconvenient and messy; it requires wrapping of the nozzle with a rag to avoid undesired grease stains, and subsequent disposition of the rag. Heating of the grease in this manner is also unpredictable as it is difficult to know when the grease is sufficiently, thoroughly warmed for ease of dispensing. And as the grease gun is, for example, carried through the cooler environment, the temperature of the grease quickly drops unless wrapped with a rag or otherwise protected from the environment.

Various portable warming containers and portable devices are known. Pearson, U.S. Pat. No. 4,926,029 shows a device for dispensing hot melt materials. Sirek, U.S. Pat. No. 4,974,752 teaches a heated caulk dispensing gun. Yoncak, U.S. Pat. No. 5,615,805 provides for a caulk container with heated coils. Freeman, U.S. Pat. No. 5,981,909 teaches a heated, suitcase-type carrying case for caulk guns. Fields, U.S. Pat. No. 6,209,723 shows a tool wrap device. Portable, electrically heated carriers and holders such as commonly use for pizza and other food items are shown in numerous patents, and are perhaps the most commonly known portable warming devices. However, none of these devices are particularly suitable for use with grease guns, and none address the above-noted drawbacks associated therewith.

Accordingly, there is a need for device that addresses these and other drawbacks and disadvantages associated with the desire to use a grease gun in cooler environments.

SUMMARY OF THE INVENTION

The general aim of the present invention is to provide a new device adapted to address the drawbacks and disadvantages conventionally associated with the use of a grease gun in cooler environments.

In particular, it is a primary objective of the invention to provide a grease gun holder that is configured to optionally warm the grease in a grease gun for ease of dispensing in cooler environments.

A detailed objective of the invention is to provide a grease gun holder that is configured for ease of installation and removal of a grease gun.

Another detailed objective of the invention is to provide a grease gun holder that is configured to carry a spare tube of grease.

Another detailed objective of the invention is to provide a grease gun holder that is flexible, relatively light weight, and readily portable.

Another detailed objective of the invention is to provide a grease gun holder that catches drainage from the hose.

Another detailed objective of the invention is to provide a grease gun holder that protects the grease gun and spare grease cartridge from the outside environment.

These and other objectives and advantages of the invention will become more apparent from the following detailed description when taken in conjunction with the accompanying drawings.

A preferred grease gun holder in accordance with the invention includes a body and a closure flap that are fabricated from a flexible, yet durable material such as heavyweight canvas-type material. The body is provided with elongated pockets sized to snugly receive the body of a grease gun and a spare grease cartridge. The flap is configured to be drawn snugly against the grease gun handle, while providing an exit opening for the grease gun hose such that the nozzle at the end of the hose is received into a pocket in the outer side of the holder. The grease gun holder is further provided with electrical heating elements generally surrounding the grease gun and spare cartridge to maintain the grease in a readily usable condition in cooler environments.

BRIEF DESCRIPTION OF THE DRAWINGS

FIG. 2 is a front elevation view of the closed grease gun holder of FIG. 1, and showing a grease gun secured therein.

FIG. 3 is a left side view of the closed grease gun holder.

FIG. 4 is a front elevation view of the grease gun holder with the closure flap in an open position, and showing the grease gun and a spare grease cartridge is dashed lines.

FIG. 5 is a left side view of the grease gun holder with the closure flap in said open position.

Figure 1:
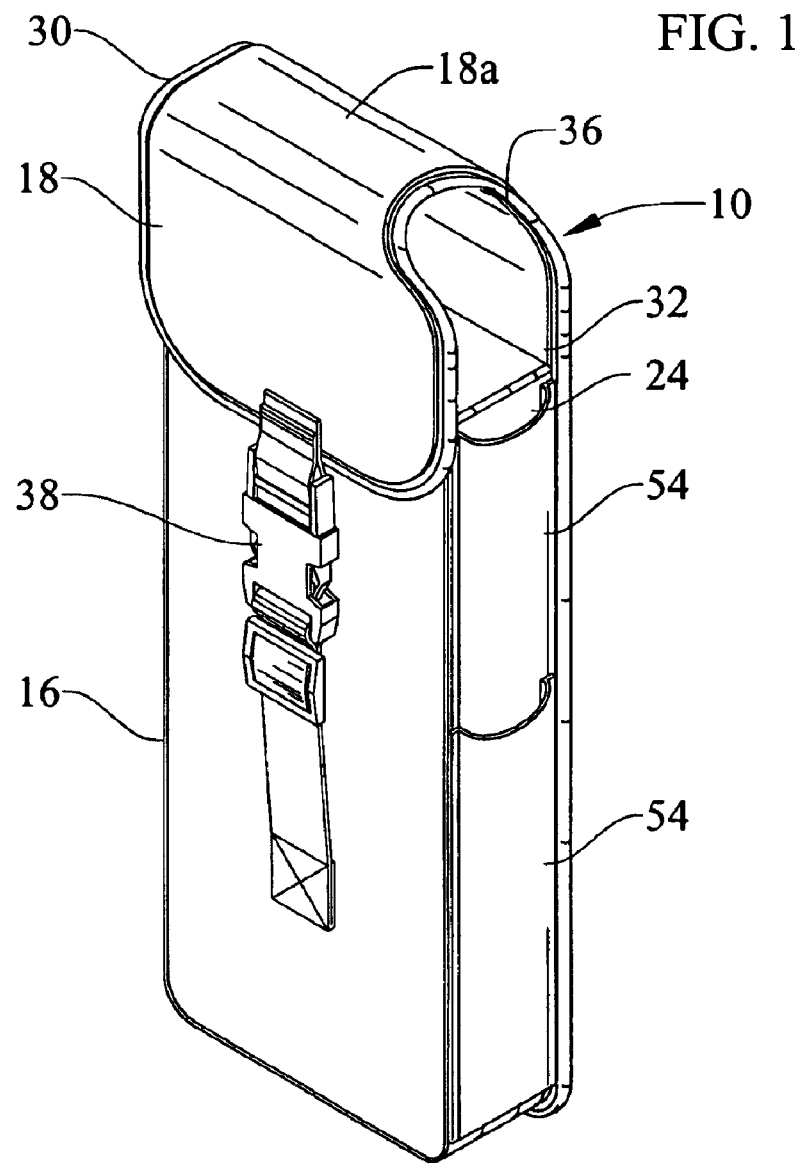
FIG. 1 is a perspective view of a new and improved grease gun holder incorporating the unique aspects of the present invention, and showing a closure flap in a closed position.

The following reference numerals correspond to the associated items shown in the drawings and discussed in detail below:

10—grease gun holder
12—grease gun
12a—grease gun hose
12a—grease gun hose
14—grease cartridge
16—body
16a—compartment
18—flap 18a—intermediate portion of flap (top of flap when in closed position)
20—front wall
22—back wall
24—side wall
26—side wall
28—bottom
30—side opening
32—side opening
34—grease gun nozzle pocket
36—cutout in flap
38—buckle
40—straps
42—slide adjuster
44—divider
44a—front flap of divider 44
46—grease gun pocket
48—grease cartridge pocket
50—shelf
52—hook and loop fastener strips
54—accessory pockets
56—heating element pads
58—electrical connector
60—electrical wires
62—insulation While the invention is susceptible of various modifications and alternative constructions, a certain illustrated embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE INVENTION

For purposes of illustration, the present invention is shown in the drawings as embodied in a portable grease gun holder 10 (FIG. 1) configured to carry a grease gun 12 (FIGS. 2, 4) and a spare grease cartridge 14 (FIG. 4).

In accordance with the invention, the grease gun holder 10 is uniquely adapted to warn the grease in the grease gun 12 and in the spare grease cartridge 14, and to maintain the grease at a suitable temperature for ready use as desired.

Briefly, the grease gun warmer 10 includes a main body 16 having an open top, and a flap 18 sized to extend over the top of the body. The body and closure flap are fabricated from a flexible and conformable, yet durable material, such as from sewn heavy-weight double-wall canvas-type material. The construction of the body and closer are further characterized as being of thermal insulating quality, such as by provision of insulating gap and/or insulating material provided therein.

The body 16 is generally rectangular, established with generally planar front and back walls, 20 and 22, respectively, first and second opposing side walls, 24 and 26, connected between the front and back walls, and a generally closed bottom 28 connected therebetween.

The closure flap 18 extends upwardly from the back wall of the body 16, and when in the closed position, extends over the top of the body and then down along the upper portion of the front wall 20. The closure flap is sized such that, when in the closed position, the intermediate portion 18a of the flap is spaced above the top of the body to establish opposing first and second side or lateral facing openings, 30 and 32, respectively, above the corresponding sides of the body.

The first side opening 30, the right side as shown, is sized for the handle and the upper portion of the grease gun 12 to extend outwardly therefrom when the body of the grease gun is positioned in the holder and the flap is closed. Conveniently, this allows the user to carry the entire unit with the handle of the grease gun. In alternate embodiments (not shown), a carrying handle is provided, connected to either the body or the flap, as an alternate arrangement for carry the entire unit. The second side opening 32, the left side as shown, is sized for the grease gun hose 12a to extend outwardly therefrom.

A retaining strap or pocket 34 is connected to the second side wall 26 of the body, and is positioned below the second side opening 32. The pocket is sized to receive the nozzle at the end of the grease gun hose 12a, to secure the hose in position along the side of the holder with the grease gun therein, and to catch excess grease as it may drip from the end of the nozzle.

A lateral cutout 36 formed in the side of the intermediate portion 18a of the closure flap 18, at the top of the flap when in the closed position, establishes the opening 32 opening both upwardly and laterally and sized to generally embrace the upper portion of the grease gun 12 when the flap is closed over the body 16 and grease gun 12.

A two-piece quick-release buckle 38 is secured to straps 40, 42 sewn to each of the body 16 and the flap 18 for releasably securing the closure flap in position over the body, to open and close the grease gun holder 10. The length of at least one of the strap members is preferably adjustable such that the cutout 36 in the closure flap can be drawn to snugly embrace the upper portion of the grease gun.

Figure 6:
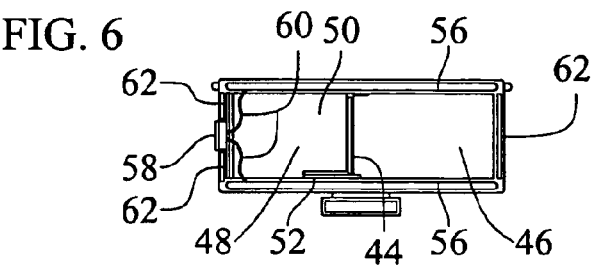
FIG. 6 is a cross-sectional view taken substantially along the line 6—6 of FIG. 4.
Figure 7:
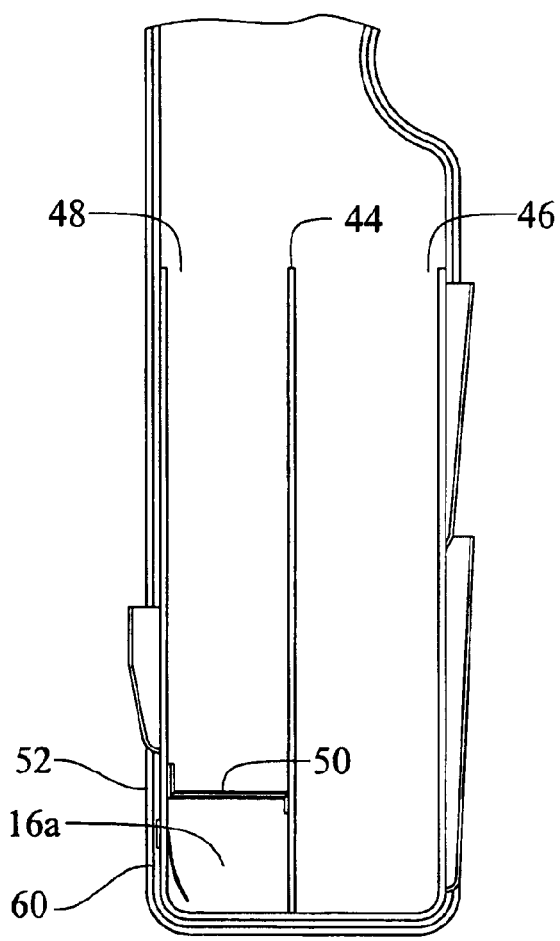
FIG. 7 is a cross-sectional view taken substantially along the line 7—7 of FIG. 6.

Referring to FIGS. 4 and 6–7, a divider 44 extends down the center of the body 16 to establish two side-by-side elongated pockets 46, 48 in the body. One pocket 48, the right pocket shown, is sized to snugly receive the body of the grease gun 12, and the other pocket 46, the left pocket as shown, is sized to snugly receive the spare grease cartridge 14. A shoulder or small shelf 50 is spaced above the bottom 28 of the body 16 on the left side of the divider 44 to establish an intermediate floor for the spare grease cartridge 14 to rest on when positioned therein, and to establish a compartment 16a therebelow.

In the embodiment shown, the back of the divider 44 is sewn to the inside of the back wall 22 of the body 16, and the front of the divider is releasably secured in position with complimentary hook and loop fastener strips 52 (FIG. 6) sewn to a front flap 44a in the divider and the inside of the front wall 20 of the body. This configuration permits fabrication of the holder with maximum size heating elements (discussed below) in the front and back walls of the holder. For ease of fabrication, the shelf 50 is similarly sewn in position to the divider wall, and the opposite side of the shelf is secured to the side wall of the body with complimentary hook and loop patches sewn thereto. A pair of optional pockets 54, to hold grease gun tools and accessories, are sewn to the right side of the body.

Figure 8:
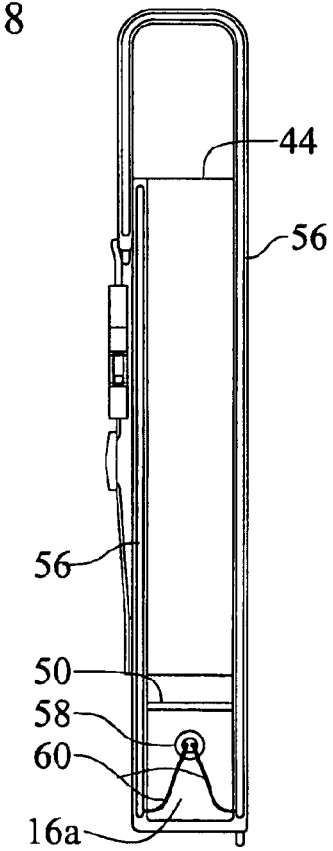
FIG. 8 is an cross-sectional view taken substantially along the line 8—8 of FIG. 4, but showing the flap in said closed position of FIG. 2.

Referring to the cross-sectional views of FIGS. 6–8, the grease gun holder 10 further includes flexible electric heating element pads 56 sewn into the canvas double-thickness walls of the body 16. The heating elements are electrically connected to an electrical connector 58 that is located in the side of the body below the shelf 50 via electrical wires 60 that are housed in the compartment 16a therebelow. The preferred heating element pads and electrical connector are of a type suitable for connecting to the electrical system of a farm or other vehicle.

In preferred embodiments, heating element pads 56 are provided in and substantially filling both the front 20 and back 22 walls of the body. The back heating element further extends upwardly throughout the closure flap 18 such that the grease gun and grease cartridge are substantially surrounding with the heating elements (see FIG. 8). The remaining walls of the grease gun holder, i.e., the side walls 24, 26 and the bottom 28 of the holder are provided with a thickness of insulating material 62 substantially filling the space between the double-thickness canvas walls thereof. As a result, the grease gun holder enables heating of the grease in both the grease gun and in the spare cartridge in cooler environments.

In warmer environments, the grease gun holder 10 is a convenient, drip-free device to store and carry a grease gun and a spare grease cartridge from one location to another. In cooler environments, the grease gun holder enables provision of warmed, readily usable grease. The grease gun holder is simply plugged into an electrical power supply, such as into an accessory plug in a vehicle, to warm the grease in the grease gun and the spare cartridge. Consequently, flowable grease is readily available, such as while traveling from one location to another, or by otherwise maintaining the holder connected to the electrical power source.

Those skilled in the art will appreciate and readily devise alternate embodiments not shown in the drawings but that are within the scope of the present invention. For example, in one alternate embodiment (not shown), the grease gun holder is provided with only one pocket to receive the body of the grease gun. In this instance, a compartment is established below the one pocket for positioning of the electrical wired between the connector and the heating elements.

From the foregoing, it will be apparent that the present invention brings to the art a new and improved grease gun holder which, by virtue of its unique configuration, enables provision of readily usable grease in both warmer and cooler environments.

I claim:

1. A grease gun holder comprising:
   a) a body generally fabricated from a flexible, insulating material, said body having an open top and including:
      (1) a front wall,
      (2) a back wall,
      (3) first and second side walls connected between the front and back walls,
      (4) a bottom connected between said front, back and side walls to establish an elongated pocket with an open top, and
      (5) an intermediate floor positioned above said bottom in said pocket to establish a compartment therebetween;
   b) a closure flap extending upwardly from the back wall of the body,
      (1) the flap being movable between an open position providing access to the open top of the pocket and a closed position generally covering the top of the pocket;
      (2) the flap having an intermediate portion spaced above the top of the body and establishing first and second lateral openings above the top of said first and second side walls, respectively, when in the closed position;
   c) first and second heating element pads connected to said front and back walls of the body;
   d) a two-part closure, with one each of said parts being connected to said body and said flap, respectively, for releasably connecting the flap to said body in said closed position;
   e) a retainer strip connected outwardly of said second side wall and opening upwardly;
   f) an electrical connector connected to said body; and
   g) electrical wires positioned in said compartment and connecting between said connector and said heating element pads.

2. The grease gun holder as defined in claim 1 in which said flap is provided with a cutout that extends inwardly along said intermediate portion whereby said first opening opens facing both laterally and upwardly with the flap in the closed position.

3. The grease gun holder as defined in claim 1 further comprising hook and loop patches releasably connecting said intermediate floor in said one pocket.

4. The grease gun holder as defined in claim 1 in which said second heating element pad extends over the top of the pocket with the flap in said closed position.

5. The grease gun holder as defined in claim 1 in which the heating element pads are embedded in said front and back walls of said body.

6. A grease gun holder comprising:
   a) a body generally fabricated from a flexible, insulating material, said body having an open top and including:
      (1) a front wall,
      (2) a back wall,
      (3) first and second side walls connected between the front and back walls,
      (4) a bottom connected between said front, back and side walls,
      (5) an intermediate wall connected between said front and back walls and positioned between said side walls to establish first and second elongated pockets with open tops between said intermediate wall and said first and second side walls, respectively, and
      (6) an intermediate floor positioned above said bottom in one of said pockets to establish a compartment therebetween;
   b) a closure flap extending upwardly from the back wall of the body,
      (1) the flap being movable between an open position providing access to the open tops of the pockets and a closed position generally covering the open tops of the pockets;
      (2) the flap having an intermediate portion spaced above the top of the body and establishing first and second lateral openings above the top of said first and second side walls, respectively, when in the closed position;
   c) first and second heating element pads connected to said front and back walls of the body;
   d) a two-part closure, with one each of said parts being connected to said body and said flap, respectively, for releasably connecting the flap to said body in said closed position;
   e) a retainer strip connected outwardly of said second side wall and opening upwardly;
   f) an electrical connector connected to said body; and
   g) electrical wires positioned in said compartment and connecting between said connector and said heating element pads.

7. The grease gun holder as defined in claim 6 in which said flap is provided with a cutout that extends inwardly along said intermediate portion whereby said first opening opens facing both laterally and upwardly with the flap in the closed position.

8. The grease gun holder as defined in claim 6 further comprising hook and loop strips releasably connecting the intermediate wall to one of said front and back walls.

9. The grease gun holder as defined in claim 6 further comprising hook and loop patches releasably connecting said intermediate floor in said one pocket.

10. The grease gun holder as defined in claim 6 in which said second heating element pad extends over the tops of the pockets with the flap in said closed position.

11. The grease gun holder as defined in claim 6 in which the heating element pads are embedded in said front and back walls of said body.

12. A grease gun holder comprising:
   a) a body generally fabricated from a flexible, insulating material, said body having an open top and including:
      (1) a front wall,
      (2) a back wall,
      (3) first and second side walls connected between the front and back walls,
      (4) a bottom connected between said front, back and side walls,
      (5) an intermediate wall extending between said front and back walls and positioned between said side walls to establish first and second elongated pockets with open tops between said intermediate wall and said first and second side walls, respectively,
      (6) an intermediate floor positioned above said bottom in one of said pockets to establish a compartment therebetween, and
      (7) hook and loop fasteners releasably connecting said intermediate wall and said intermediate floor in said positions;
   b) a closure flap extending upwardly from the back wall of the body,
      (1) the flap being movable between an open position providing access to the open tops of the pockets and a closed position generally covering the open tops of the pockets;
      (2) the flap having an intermediate portion spaced above the top of the body and establishing first and second lateral openings above the top of said first and second side walls, respectively, when in the closed position, the intermediate portion having a cutout that extends inwardly from one said thereof whereby said first opening opens facing both laterally and upwardly with the flap in the closed position;
   c) a first heating element pad embedded in said front wall;
   d) a second heating element pad embedded in said back and said flap, said second heating element being sized to extend over the tops of the pockets with the flap in said closed position;
   e) a two-part closure, with one each of said parts being connected to said body and said flap, respectively, for releasably connecting the flap to said body in said closed position;
   f) a retainer strip connected outwardly of said second side wall and opening upwardly,
   g) an electrical connector connected to said body; and
   h) electrical wires positioned in said compartment and connecting between said connector and said heating element pads.

* * * * *